(12) United States Patent
Elizalde Gonzalez et al.

(10) Patent No.: US 9,174,857 B2
(45) Date of Patent: Nov. 3, 2015

(54) PROCESS FOR OBTAINING AN ADSORBENT FROM AVOCADO WASTE AND USE OF THE ADSORBENT

(71) Applicant: UNIVERSIDAD AUTONOMA DE PUEBLA, Puebla (MX)

(72) Inventors: Maria de la Paz Elizalde Gonzalez, Puebla (MX); Martin Marino Davila Jimenez, Puebla (MX); Omar Ornelas Davila, Tlaxcala (MX)

(73) Assignee: UNIVERSIDAD AUTONOMA DE PUEBLA, Puebla (MX)

( * ) Notice: Subject to any disclaimer, the term of this patent is extended or adjusted under 35 U.S.C. 154(b) by 175 days.

(21) Appl. No.: 13/952,159

(22) Filed: Jul. 26, 2013

(65) Prior Publication Data

US 2013/0306564 A1  Nov. 21, 2013

Related U.S. Application Data

(62) Division of application No. 12/492,227, filed on Jun. 26, 2009, now Pat. No. 8,501,663.

(51) Int. Cl.
| | | |
|---|---|---|
| *B01D 15/00* | (2006.01) | |
| *C02F 1/28* | (2006.01) | |
| *B01J 20/20* | (2006.01) | |
| *B01J 20/28* | (2006.01) | |
| *C01B 31/08* | (2006.01) | |
| *C01B 31/12* | (2006.01) | |
| *C02F 101/20* | (2006.01) | |
| *C02F 101/30* | (2006.01) | |
| *C02F 103/30* | (2006.01) | |

(52) U.S. Cl.
CPC ............... *C02F 1/286* (2013.01); *B01D 15/00* (2013.01); *B01J 20/20* (2013.01); *B01J 20/2808* (2013.01); *C01B 31/081* (2013.01); *C01B 31/086* (2013.01); *C01B 31/12* (2013.01); *C02F 1/283* (2013.01); *C02F 2101/20* (2013.01); *C02F 2101/308* (2013.01); *C02F 2103/30* (2013.01)

(58) Field of Classification Search
CPC ...................................................... B01D 15/00
See application file for complete search history.

(56) References Cited

U.S. PATENT DOCUMENTS

| 4,203,868 A | 5/1980 | deJong |
| 5,304,527 A | 4/1994 | Dimitri |

FOREIGN PATENT DOCUMENTS

| GB | 1142804 | 2/1969 |
| JP | 2001151636 | 6/2001 |
| MX | PA/a/2003/004831 | 5/2003 |

OTHER PUBLICATIONS

Elizalde-Gonzalez, M. et al., Guava seed as an adsorbent and as a precursor of carbon for the adsorption of acid dyes, Bioresource Technology 100 (2009) 2111-2117.
Gupta et al, Adsorbents for Water Treatment: Development of Low-Cost Alternatives to Carbon, Encyclopedia of Surface and Colloid Science, 2nd Edition, Taylor & Francis, New York, (2006) 149.
Annadurai et al., Use of cellulose-based wastes for adsorption of dyes from aqueous solutions, Journal of Hazardous Materials B92 (2002) 263-274.
Elizalde-Gonzalez et al, Development of non-carbonised natural adsorbents for removal of textile dyes, Trends Chem. Eng. J., 108, (2005) 55.
Mendez et al., Preparation of carbon-based adsorbents from pyrolysis and air activation of sewage sludges, Chemical Engineering Journal, 108 (2005) 169-177.
The Economics of Activated Carbon, 8th edition, 2008.
Weatherby et al. Chemical composition of avocado seed, Ind. Eng. Chem. 23 (1931) 1421.
Malowan, Properties of the catalase of the seed of the avocado, Enzymology 5 (1938) 89-94.
Geissman et al., A proanthocyanidin from avocado seed, Phytochemistry 4 (1965) 359-68.
Jaques et al., Plant proanthocyanidins. II. Proanthocyanidin A2 and its derivatives, J. Chem. Soc. Perkin Trans. 1, 23 (1974) 2663-71.
Richtmyer, Isolation of volemitol and other polyhydric alcohols from avocado seeds, Carbohydrate Research 12 (1970) 135-8.
Nunez et al., Analysis of auxins in the fruits of mamey colorado trees (Calocarpum sapota) and avocado trees (Persea gratissima), Ciencias, Serie 3: Quimica 18 (1974) 1-14.
Ichimaru et al., Study of antinutritional factors in avocado seeds (Persea americana Mill. cv. Wagner), Coletaza Instituto Tec. Alim. 12 (1982) 67-83.
Werman et al., A simple and sensitive method for detecting avocado seed oil in various avocado oils, J. Am. Oil Chem. Soc. 73 (1996) 665-667.
Daulatabad et al., Unusual fatty acid in Persea americana (butter fruit) seed oil, J. Oil Technol. Assoc. India 30 (1998) 71-2.
Lee et al., Antioxidant activities and induction of apoptosis by methanol extracts from avocado, Han'guk Sikp'um Yongyang Kwahak Hoechi 37(3) (2008) 269-275.

(Continued)

*Primary Examiner* — Stuart Hendrickson
(74) *Attorney, Agent, or Firm* — Dickinson Wright PLLC (57) ABSTRACT

A procedure of obtaining adsorbent from a waste material and its use are disclosed. This invention provides a natural waste material, specifically avocado seed, its preparation and use for the filling of columns used in the elimination of contaminants present in wastewater. The particles have an irregular shape and variable size for filling columns of different diameter and length. The adsorbent has sufficient hardness for avoiding a particle collapse. The material does not rot, is re-generable and ecological. In the present invention the preparation of the adsorbent, its pre-activation, carbonization and application to eliminate the color of textile wastewater is disclosed.

The color elimination from textile wastewater, as well as decrease of salts, total suspended solids, chemical oxygen demand (COD) and total organic carbon (TOC), is carried out passing the textile wastewater through a column filled with the prepared adsorbent. In batch systems metals dissolved in water can be eliminated.

10 Claims, 4 Drawing Sheets

(56) References Cited

OTHER PUBLICATIONS

Hirasawa et al., Quantification and functional analysis of dietary fiber and polyphenols in avocado, Nippon Shokuhin Kogaku Kaishi 55(3) (2008) 95-101.

Valeri et al., Phytochemical and toxicological study of the fruits of the avocado pear (Persea americana), Rev. Med. Veter. Parasit. 12 (1953) 131-65.

Yaakobovich et al., Partial isolation and characterization of a hemagglutinating factor from avocado seed, Archives of Toxicology 6 (1983) 52-7.

Werman et al., Partial isolation and characterization of a new natural inhibitor of lysyl oxidase from avocado seed oil, J. Agric. Food Chem. 38 (1990) 2164-8.

Werman et al., The effect of various avocado oils on skin collagen metabolism, Connective Tissue Research 26 (1991) 1-10.

Rosenblat et al., Chemical Characterization of Lysyl Oxidase Inhibitor from Avocado Seed Oil, J. Am. Oil Chem. Soc. 72(2) (1995) 225-9.

Werman et al., The effect of avocado oils on some liver characteristics in growing rats, Food and Chemical Toxicololgy 27(5) (1989) 279-82.

Werman et al., Avocado oils and hepatic lipid metabolism in growing rats, Food Chem. Toxicol. 29(2) (1991) 93-9.

Devi et al., COD and BOD reduction from coffee processing wastewater using avocado peel carbon, Biores. Technol. 99 (2008) 1853-1860.

Elizalde-Gonzalez et al., Characterization of adsorbent materials prepared from avocado kernel seeds: natural, activated and carbonized forms, J. Anal. Appl. Pyr. 78 (2007) 185-93.

PROCESS FOR OBTAINING AN ADSORBENT FROM AVOCADO WASTE AND USE OF THE ADSORBENT

CROSS-REFERENCE TO RELATED APPLICATION

This application is a divisional application of Ser. No. 12/492,227, filed Jun. 26, 2009, which is hereby incorporated by reference in its entirety.

FIELD OF THE INVENTION

The present invention refers to an adsorbent material to be used in columns or batch systems, used for wastewater treatment, specifically, the present invention refers to a mass of pre-activated particles, carbonized or non-carbonized, from avocado seeds, that when packed in a column or placed in a batch system, are capable of removing pollutants from wastewater.

PRIOR ART DESCRIPTION

Wastewater contains in the great majority of cases organic and inorganic contaminants that produce smell, flavor, color and foam. Many of the contaminants are resistant to degradation by biological methods and cannot be eliminated through conventional treatment methods as coagulation, sedimentation and filtration.

Adsorption is an efficient method to eliminate organic and inorganic contaminants and the most common adsorbent is activated carbon. The process is usually carried out in a static system, adding the carbon to a tank that contains wastewater, stirring a determined time and letting the solid sediment and extracting the treated water. The activated carbon efficiently adsorbs 80% of the toxic substances recognized by the European Union (EUR-Lex-31976L0464) and one of its greatest applications, be it in grain or powder, is the treatment of wastewater.

The raw matter used in the preparation of activated carbon is usually wood, sawdust, mineral carbon and seeds. Other natural precursors may be coconut shell (I. Ali, V. K. Gupta, Encyclopedia of Surface and Colloid Science, $2^{nd}$ Edition, Taylor & Francis, New York, (2006) 149), fruit seeds (G. Annadurai et al., J. Hazard. Mater. B92 (2002) 263, M. P. Elizalde-Gonzalez, Trends Chem. Eng. J., 108, (2005) 55) and peat (A. Mendez et al., Chem. Eng. J., 108 (2005) 169). Many natural materials may be carbonized and the final properties, such as the hardness of the activated carbon greatly depend on the raw matter. The world demand has an ascendant trend due to the increasing sanitary legislations and the development of emerging treatment plants (The Economics of Activated Carbon, $8^{th}$ edition, 2008).

The carbonization and pyrolysis of natural materials are considered as physical or thermal methods of activation, while for the chemical activation, substances are usually used, such as $H_3PO_4$, NaOH and $ZnCl_2$. Chemical activation is generally an after-step to the carbonization and the preliminary treatment of the raw matter with chemical substances may be considered as pre-activation.

Different varieties of avocado seeds are mainly composed of starch, protein, fiber, sugars (L. S. Weatherby et al. J. Ind. Eng. Chem. 23 (1931) 1421-3) and catalase and oxidase enzymes (L. S. Malowan, Enzymology 5 (1938) 89-94). From it, proanthocyanidins (T. A. Geissman et al. Phytochemistry 4 (1965) 359-68; D. Jaques et al. J. Chem. Soc. Perkin Trans. 1, 23 (1974) 2663-71), polyhydric alcohols (N. Richtmyer, Carbohyd. Res. 12 (1970) 135-8), auxins (M. Nunez et al. Ciencias, Serie 3: Química 18 (1974) 1-14) and phenolic compounds (D. L. Ichimaru et al. Coletaza Instituto Tec. Alim. 12 (1982) 67-83) have been isolated.

The oil extracted from some avocado seeds has unique components which are not present in the oil extracted from its pulp (M. J. Werman et al. J. Am. Oil Chem. Soc. 73 (1996) 665-667; C. D. Daulatabad et al. J. Oil Technol. Assoc. India (1998) 71-2) and may be present in cosmetics (JP patent 2001151636 and Mexican patent application No. PA/a/2003/004831) and in therapeutic components (British patent No. GB 1 142 804). In regards to its therapeutic components, its anti-oxidative properties (S. G. Lee et al. Han'guk Sikp'um Yongyang Kwahak Hoechi 37 (2008) 269-275; M. Hirasawa et al. Nipon Shokuhin Kagaku Kaishi 55 (2008) 95-101), its antibiotic activity (H. Valeri et al. Rev. Med. Veter. Parasit. 12 (1953) 131-65), its hemagglutinating activity (Y. Yaakobovich et al. Arch. Toxicol. 6 (1983) 52-7) and its lisyl oxidase inhibitory activity (M. J. Werman et al. J. Agric. Food Chem. 38 (1990) 2164-8; M. J. Werman et al. Conn. Tissue Res. 26 (1991) 1-10; G. Rosenblat et al. J. Am. Oil Chem. Soc. 72 (1995) 225-9) have been studied. This oil has also been used to study the hepatic metabolism in rats (M. J. Werman et al. Food Chem. Toxicol. 27 (1989) 279-82; M. J. Werman et al. Food Chem. Toxicol. 29 (1991) 93-9).

Within the applications given to the avocado residues, carbon preparation is reported from avocado skin (R. Devi et al. Biores. Technol. 99 (2008) 1853-1860), wherein under optimum operation conditions in static systems a 99% reduction is obtained, for both the chemical oxygen demand (COD) as well as the biological oxygen demand of the wastewater in a coffee processing plant. The carbon obtained from avocado seed by chemical activation from $H_3PO_4$ at 800° C. in flow with nitrogen (M. P. Elizalde-Gonzalez et al. J. Anal. Appl. Pyr. 78 (2007) 185-93) was used to study the adsorption (the elimination percentage indicated in parenthesis) of the following textile dyes in de-ionized water with concentrations 400 mg/L: basic violet 16 (99%), basic blue (99%) acid blue 74 (80%), acid green 25 (75%) and reactive black 5 (40%).

Therefore, it is an object of the present invention to elaborate an organic adsorbent, ecologic and which may be regenerated for its use in columns for the treatment of wastewater.

BRIEF DESCRIPTION OF THE INVENTION

The present invention corresponds to the elimination techniques of organic and inorganic impurities from wastewater.

In the present, a procedure of obtaining an adsorbent from a natural waste material, its preparation and its use to be packed in columns or loading batch vessels used in the elimination of contaminants present in wastewater is disclosed. The adsorbent particles have an irregular form and variable size to pack different diameter and length columns. The adsorbent has the sufficient hardness to avoid a particle collapse. The material does not rot; it may be regenerated and is ecological. The present invention discloses the preparation of the adsorbent, its pre-activation, carbonization and application for the elimination of color and contaminants from textile wastewater.

Color elimination from textile wastewater, as well as the reduction of salt content, total suspended solids, contaminants, chemical oxygen demand (COD) and total organic carbon (TOC), is carried out by filtering the textile wastewater through a glass column filled with the prepared absorbent. Alternately, the above may be done in a batch system.

The raw matter for the production of the adsorbent are irregular shaped particles obtained from avocado seed of the species *Persea Americana* Mill, and more preferably of the Hass variety.

The fruit is usually transversely cut for the consumption of its pulp, and the seed, known as "bone" is separated from the pulp and skin, and is dried at ambient temperature. Said seed is cut preferably with a scalpel in several large parts and said parts are dried. Said parts are triturated, preferably with a windmill with blades with a mesh. The triturated parts are collected and meshed to select the particle size of the fraction of greater quantity.

For the pre-activation, after sieving, the recollected particles are placed in a recipient and a sodium hydroxide (NaOH 2N) dissolution is added and the mixture is agitated. Water is added, and the mixture is again agitated; later the mixture is left to settle. Afterwards, the mixture is decanted. Following, the mixture is washed with water, agitating and decanting said mixture repeatedly.

The particles are filtered and placed in a new recipient wherein a hydrogen chloride (HCl 2N) dissolution is added forming a new mixture. The new mixture is agitated and water is added, again agitating the mixture; afterwards the new mixture is left to settle. The new mixture is decanted. Afterwards the new mixture is washed with water, agitating and decanting repeatedly. The particles of the new mixture are decanted, filtered and the extracted particle material from said filtration is dried at ambient temperature.

A mass of pre-activated particle material is introduced into an oven for its carbonization.

The carbonized pre-activated particles of avocado seed are packed in a column wherein wastewater is passed through. The carbonized pre-activated particles are capable of de-coloring wastewater, as well as eliminating organic, inorganic, ionic and polymeric compounds, salts and dissolved surfactants of said wastewater.

BRIEF DESCRIPTION OF THE FIGURES

The particular features and advantages of the invention, as well as other objects of the invention, will become apparent from the following description taken into account with the figures, from which.

DETAILED DESCRIPTION OF THE INVENTION

The raw matter for the production of the adsorbent, are irregularly shaped particles obtained from avocado seeds of the species *Persea americana* Mill, and more preferably of the Hass variety. Specifically, the preferred matter for the production of the adsorbent is the embryo of the Hass variety avocado seed, wherein the matter for production has an approximate specific surface of ~1 $m^2/g$ (measured by the BET nitrogen adsorption method), a porosity of between 43 to 56%, preferably between 51 to 53% and has a density of between 0.37 to 0.4 $g/cm^3$, and more preferably between 0.39 to 0.4 $g/cm^3$.

The raw matter is adequate for the preparation of activated carbon with a specific surface area of between 100 to 600 $m^2/g$, and more preferably between 200 to 500 $m^2/g$ and a density of between 0.2 to 0.3 $g/cm^3$, and more preferably between 0.240 to 0.280 $g/cm^3$. The invention provides a solid absorbent capable of de-coloring and eliminating metals, organic, inorganic, ionic and polymeric compounds, salts and surfactants, dissolved in textile wastewater using the material obtained by the method described below, from waste material.

The fruit seed, known as "bone", is separated from the pulp and skin, and is recollected and let dry at ambient temperature. Said seed is cut, preferably with a scalpel in several large parts and said large parts are let dry. Said large parts are triturated, preferably with a windmill with blades with a mesh to generate particles. The particles are collected and meshed to select the particle size of the fraction of greater quantity. It is preferable that the particle size be smaller or equal to 2 mm, more preferably in a range of 0.3 to 1.5 mm and even more preferably between 0.5 to 0.8 mm as seen from FIG. 1.

Figure 1:
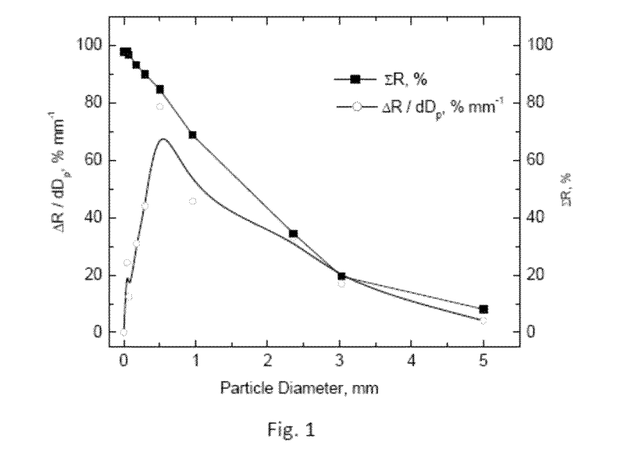
FIG. 1 is a graph showing the accumulative (■) and differential (○) distribution curves of the particle size of the material obtained after the grinding of a lot of avocado bones.

Specifically, in said FIG. 1 the accumulative curve with squared markers (■), as well as the differential curve with circular markers (○), wherein said markers show the particle size distribution of the material after having grinded a batch of avocado seeds. Specifically, in said figure the preferential points for particle size are observed.

After the grinding step of the avocado seed to generate particles, said particles are pre-activated.

For the pre-activation, the recollected particles, after meshing, are placed in a recipient and a sodium hydroxide (NaOH 2N) dissolution is added and agitated. The weight relation between the NaOH and the particles is approximately 0.25 kg/L. The particles are left to settle in the NaOH solution. Afterwards, water is added and again agitated and the mixture is settled. Afterwards, the mixture is decanted. Later, the residues are washed with water, agitated and decanted repeatedly. Preferably the mixtures are decanted with water at least twice. Preferably, the weight relation between water and the particles for washing is approximately 0.25 kg/L.

The particles are filtered and put in a new recipient wherein hydrogen chloride (HCl 2N) dissolution is added, forming a new mixture that will allow neutralize the pre-activation of the particles. The relation between HCl and the particles is approximately of 0.25 kg/L. The new mixture is agitated and water is added, agitating again; later, the new mixture is left to settle. The new mixture is decanted. Later, the residues are washed with water, agitated and decanted repeatedly. Preferably the mixtures are decanted with water at least twice. Preferably, the weight relation between water and the particles for washing is approximately 0.25 kg/L. The particles of the new mixture are decanted, filtered and the extracted particle material of said filtration is let dry at ambient temperature.

A mass of the pre-activated particle material is introduced into an oven for its carbonization. The oven may be, without being limited to, a type of tubular oven of concentric tube quartz-ceramic, with maximum temperature operation of 1200° C. The carbonization process is carried out in two different temperatures, according to the thermal behavior of the raw matter. In a first temperature, a drying of the pre-activated raw matter is carried out during an approximate time of between 45 to 75 minutes, more preferably between 55 to 70 minutes, at an approximate temperature of between 150 to 250° C., more preferably at an approximate temperature of between 185 to 235° C., rising the ambient temperature at an approximate speed of 6 to 12° C./min, and more preferably of between 8 to 11° C./min. In a second temperature the carbonization and drying of the pre-activated raw matter is carried out, during an approximate time similar to the first temperature, at an approximate temperature of between 600 to 1200° C., more preferably at an approximate temperature of between 700 to 1100° C., rising the ambient temperature at an approximate speed of between 3 to 7° C./min, more preferably between 4 to 6° C./min.

The carbonized pre-activated particles of avocado seed are packed in a column where wastewater is passed. The carbonized pre-activated particles are capable of de-coloring the wastewater, as well as, in view of its micro-porosity, adsorbing and consequently eliminating organic, inorganic, ionic and polymeric compounds, salts and surfactants in said wastewater.

The raw matter, the pre-activated particles and the activated carbon obtained from the pre-activated raw matter has the features presented in Table 1.

TABLE 1

Features of the material as raw matter, as pre-activated raw matter and as activated carbon.

| Material | Yield (%) | Density (g/cm$^3$) | Humidity (%) | Porosity (%) | Ash (%) | Specific Surface area (m$^2$/g) |
|---|---|---|---|---|---|---|
| Initial State | — | 0.393 | 6.757 | 58 | 2.2 | 0.8 |
| With pre-activation | 43 | 0.506 | 3.79 | 41 | 0.1 | 1.0 |
| Activated Carbon | 13 | 0.281 | 1.63 | — | 0.21 | 200-500 |

The particles have an irregular shape and a variable size to fill columns of different diameter and length. The adsorbent has the sufficient hardness to avoid that the particles collapse.

Having described the process by which the carbonized pre-activated particles and the pre-activated particles are made, the following are use and comparison examples.

EXAMPLE 1

A column with a 240 mm length, inner diameter of 9 mm and packing volume of 15 cm$^3$, is packed with non pre-activated dry raw matter, wherein wastewater is supplied at an ascendant flow with a residence time in the column of 60 minutes. The tests carried out with 4 samples (M2, M3, M4 and M5) of wastewater of a local textile industry, recollected in different days at 19.00 hours of the same cistern display the following maximum de-coloration values at 560 nm as shown in Table 2.

TABLE 2

Samples of wastewater prior and after treatment with dry raw matter in ascendant flow. Residence time 60 minutes.

| | Sample | | | |
|---|---|---|---|---|
| | M2 | M3 | M4 | M5 |
| Initial COD (mg/L) | 3600 | 4200 | 2800 | 2600 |
| Initial TOC (mg/L) | 1400 | 1400 | 800 | 1200 |
| Fraction (eluted mL) | 6 | 2 | 14 | 26 |
| % de-coloration at 560 nm | 75 | 62 | 32 | 28 |

EXAMPLE 2

Figure 2:
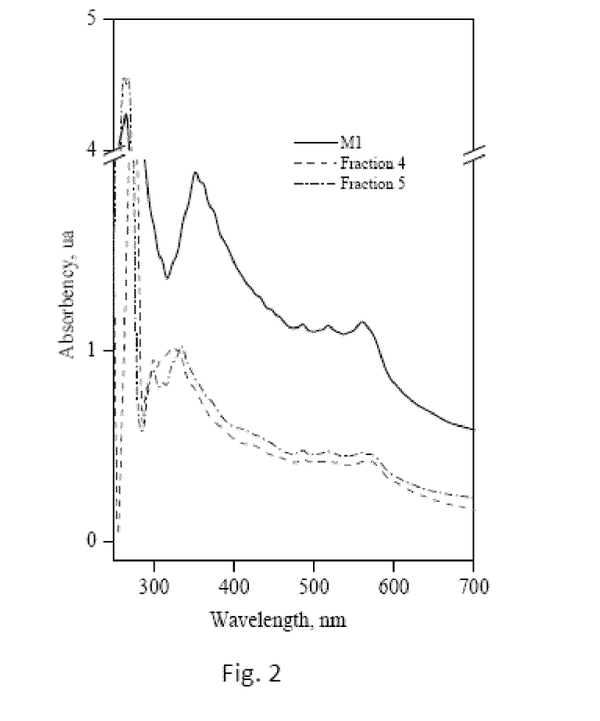
FIG. 2 is a spectrum showing the coloration reduction of sample "M1" of textile wastewater in two successive fractions in descendent form by the packed column with raw matter.

A column with a length of 300 mm, an inner diameter of 10 mm and a packing volume of 24 cm$^3$ is filled with non pre-activated wet raw matter. The tests carried out with descending flow of sample "M1" of wastewater of a local textile industry did not produce variation of the pH values and conductivity, however, decreased 80% of the chemical oxygen demand (COD) and 90% of the total organic carbon (TOC) as shown in Table 3. In the electromagnetic spectrum of the visible region, a 64% de-coloration of the band at 330 nm was achieved as seen in FIG. 2.

TABLE 3

Features of sample "M1" of wastewater prior and after the treatment with raw matter in a descending dynamic regimen. Residence time in the column of 72 minutes.

| Sample | pH | Conductivity (mS) | DQO (mg/L) | TOC (mg/L) |
|---|---|---|---|---|
| Water | 5.4 | 0.002 | — | — |
| Blank | 6.0 | 0.52 | — | — |
| M1 | 7.6 | 2.8 | 2400 | 730 |
| 6 mL eluted fraction | 7.5 | 2.8 | 500 | 80 |

EXAMPLE 3

A column with a length of 240 mm, an inner diameter of 9 mm and a packing volume of 15 cm$^3$ is filled with non pre-activated raw matter and wastewater is passed through the column in an ascending dynamic regimen with a residence time of said water in the column of 72 minutes. The tests carried with sample "M4" of wastewater previously filtered diminished the coloration 50% at 560 nm.

EXAMPLE 4

The raw matter (6 g) with a particle size of 0.5 mm is packed as suspension in methanol in a 24 cm length column, with an inner diameter of 0.9 cm. Next, textile wastewater M4 is passed with an ascending flow of 50 mL with a flow speed of 0.11 mL/min. In the eluted fraction, corresponding to 7 mL, the band at 271 nm decreases 75%, the band at 351 nm decreases 40% and the band at 565 nm decreases 60%.

EXAMPLE 5

If sample M4 is filtered previously, in identical conditions of elution, in the eluted fraction, corresponding to 40 mL, the diminution of the bands is 40% with regards to the filtered M4 sample.

EXAMPLE 6

Washing the column with 50 mL of distilled water, the packed column with raw matter may be re-used, producing under identical eluting conditions, a 50% decrease in the bands of the eluted fraction corresponding to 7 mL.

EXAMPLE 7

The raw matter used for the de-coloration of several wastewater samples was unpacked from a column. Later it was carbonized at 1000° C. and used as an adsorbent with added value in a batch system that contains 400 mg of carbon with specific surface of 200 m$^2$/g and 20 mL of water that contains 15 mg/L of Nickel and 84 mg/L of Zinc. The prepared carbon by the disclosed procedure eliminates 92% of Nickel and 99% Zinc.

EXAMPLE 8

A column with a length of 240 mm, an inner diameter of 9 mm, and a packing volume of 13.3 cm$^3$ is packed with pre-activated carbon prepared according to the above method. The tests carried out with wastewater sample "M5" of a local textile industry retains 50% of the salts contained in the wastewater sample, as shown by the diminution of the conductivity from a value of 3400 µs to 1700 µs.

EXAMPLE 9

Figure 7:
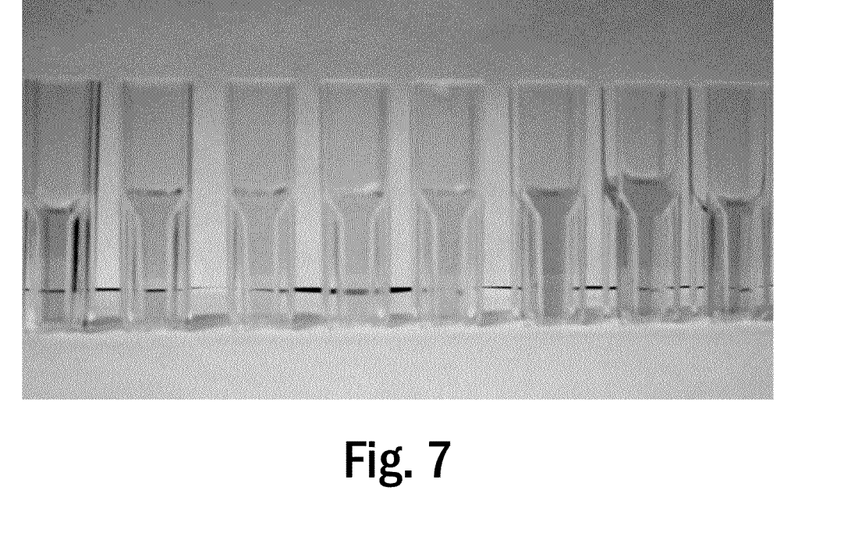
FIG. 7 is a photo of the aspect of successive fractions eluted from the column packed with carbonized pre-activated particles.

A column with a length of 240 mm, an inner diameter of 9 mm and a packing volume of 13.3 cm$^3$ is filled with pre-activated carbon prepared according to the above method. The tests carried out with wastewater sample "M5" of a local textile industry showed that the column is saturated with an eluted volume of 30 mL. De-coloration of the yellow, red and blue, a reduction of COD and TOC and a slight rise of pH was produced with an eluted volume of 10 mL. The results are shown in Table 4. The global red tone decreased as seen in FIG. 7.

TABLE 4

Features of the wastewater prior and after the treatment with 3 grams of activated carbon in an ascending dynamic regimen, at a flow speed of 3 mL/min:

| | | % De-coloration | | | | |
| --- | --- | --- | --- | --- | --- | --- |
| Sample | pH q | Yellow (436 nm) | Red (525 nm) | Blue (620 nm) | COD (mg/L) | TOC (mg/L) |
| Water | 5.4 | — | — | — | — | — |
| Blank | 6.0 | — | — | — | — | — |
| M5 | 7.5 | — | — | — | 2600 | 1200 |
| Eluted recollected fraction of 10 mL | 8.3 | 19 | 19 | 22 | 1100 | 80 |

EXAMPLE 10

Pre-activated raw matter (wastewater in batch system without stirring).

The raw matter particles obtained from avocado seeds from the *Persea americana* Mill species, and more preferably from the Hass variety is cut, sieved and pre-activated with above disclosed procedure using NaOH activator dissolution and HCl activator dissolution. The weight relation between NaOH and the particles is about 0.25 kg/L. The pre-activation produces an adsorbent with 43% yield with regards to the mass of the raw matter, and has a specific approximate surface of ~1 m$^2$/g (measured with BET method of nitrogen adsorption) and a density of 0.506 g/cm$^3$. In a static batch system that contains the 1.4 grams of the obtained carbon, 25 mL of the residual textile water sample "M3" at 25° C. are added. The adsorbent, prepared by the above disclosed procedure, produces a 35% loss of blue dye at a wavelength of 560 nm and a 34% of the green coloration at 400 nm after 3 days.

Example 11

Pre-Activated Matter (Wastewater in a Batch System with Stirring)

The same matter as example 10 produces a 54% loss of blue coloration at a wavelength of 560 nm and 44% of the green coloration at 400 nm after 3 days.

EXAMPLE 12

Figure 3:
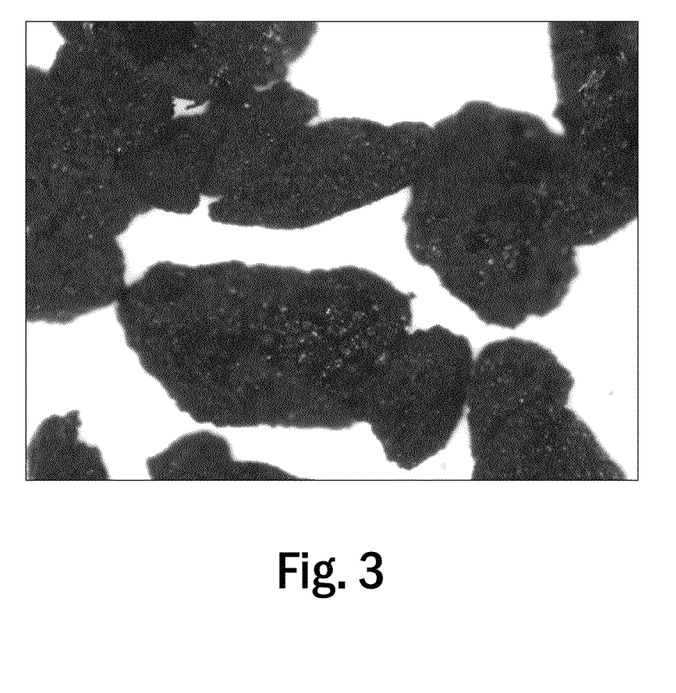
FIG. 3 is a photo of a detailed view of the carbonized material.
Figure 4:
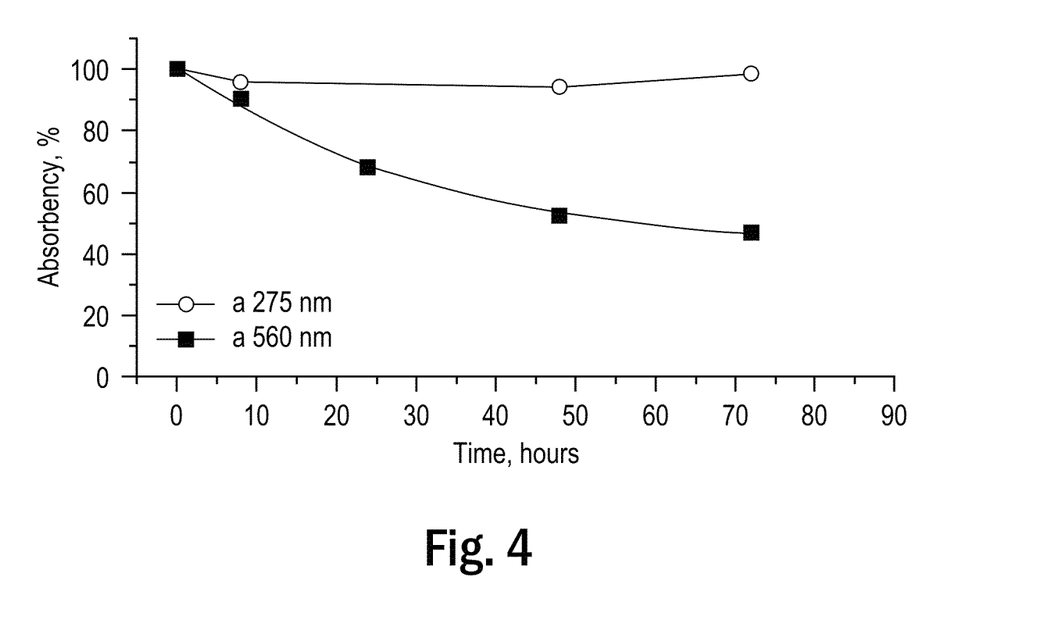
FIG. 4 is a graph showing the de-coloration kinetics at 275 nm and 560 nm of the textile wastewater "M5" in a static system.

In a static system that contains the carbon obtained by the pre-activation of the raw matter, as shown in FIG. 3, the sample of textile wastewater "M5" is mixed at 25° C. The prepared carbon by the afore-disclosed procedure, produces a 60% loss of blue dye after 3 days and does not reduce the absorbance produced by the aromatic compounds at 275 nm as seen in FIG. 4.

EXAMPLE 13

Figure 5:
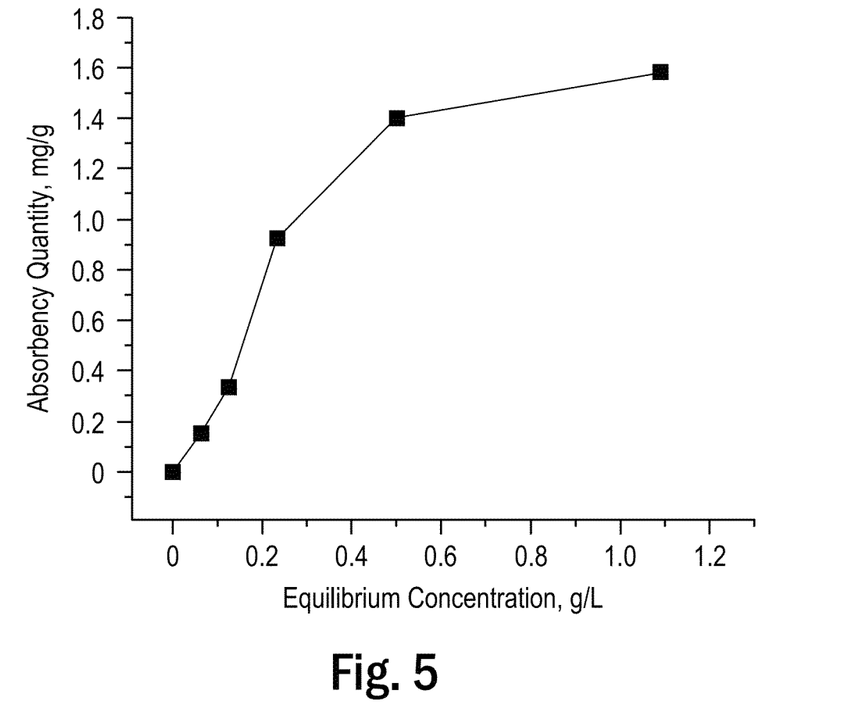
FIG. 5 is a graph showing the adsorption isotherm at ° C. of the colored compounds (560 nm) contained in wastewater "M5" by the carbon in the static system.
Figure 6:
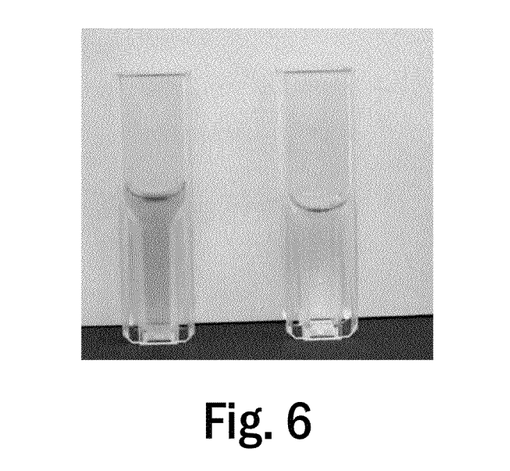
FIG. 6 is a photo of textile wastewater "M5" before and after the treatment with the carbonized pre-activated particles of the present invention.

Series of five (5) batch systems that contain 140 mg of prepared activated carbon with pre-activation and 2 mL of the sample of textile wastewater "M5" at 25° with different concentrations of colored compounds, obtained by the dilution of sample "M5". The prepared carbon by the above process has a saturation capacity of 1.5 mg/g (with regards to the initial TOC value of 1200 mg/L) with colored compounds with an absorbance at 560 nm after 24 hours as seen in FIG. 5. The sample of textile wastewater "M5" has the final aspect shown in FIG. 6.

EXAMPLE 14

In a batch system that contains 200 mg of pre-activated carbon prepared by the above mentioned method, 20 mL of de-ionized water containing 1 mg/L of the basic methylene blue dye is poured. The prepared carbon by the disclosed process produces a 6% loss of blue dye after 4 days, while the commercial carbon used for comparison, eliminates 22% of the blue coloration in the same period. The raw matter used in the production of carbon is waste material, and the prepared carbon of this invention has a reduced cost.

EXAMPLE 15

In a batch system that contains 200 mg of prepared pre-activated carbon with regards to the above disclosed method, 20 mL of de-ionized water that contains 1 mg/L of acid Orange acid dye 7 is poured. The prepared carbon by the disclosed procedure produces a 23% loss of orange coloration after 4 days, while the commercial carbon used for comparison eliminates 90% of the same orange coloration in the same time.

EXAMPLE 16

In a batch system that contains 200 mg of prepared pre-activated carbon according to the above disclosed method, 20 mL of textile wastewater "M3" that has a greenish yellow (band at 370-400 nm) and violet coloring (band 560-575 nm) is poured. The prepared carbon by the disclosed process produces a 14% loss of the greenish yellowish coloring after 4 days and a 35% loss of the violet coloring. In comparison, a commercial carbon eliminates 16% of the greenish yellowish coloring and 32% of the violet coloring in the same period of time.

EXAMPLE 17

In a batch system that contains 200 mg of prepared pre-activated carbon according to the above disclosed method, 20 mL of a sugar mixture containing 10 g/L of molasses and 1.6 g/L of lactose is poured. The carbon prepared by the disclosed procedure produces a 20% de-coloration of the mixture, similar to that produced in identical conditions of a commercial carbon used for comparison.

EXAMPLE 18

In a batch system that contains 400 mg of pre-activated carbon prepared according to the above disclosed method 20 mL of water that contains 35 mg/L of Nickel and 55 mg/L of Zinc is poured. The prepared carbon by the disclosed procedure eliminates 20% of Nickel and 50% of Zinc. In identical conditions a commercial carbon used for comparison did not have the capacity of eliminating these metallic ions.

EXAMPLE 19

Pre-Activated Carbon (Wastewater in a Batch System Without Stirring)

Raw matter particles obtained from avocado seeds of the *Persea Americana* Mill species, and more preferably of the Hass variety is cut, sieved and pre-activated by the disclosed process, using first NaOH activator dissolution, followed by HCl activator dissolution. The weight relation between NaOH and the particles is about 0.25 kg/L. The carbonization at 700° C. produces an adsorbent with 27% yield with regards to the mass of the raw matter, which has a specific surface of about ~1 $m^2$/g (measured by the BET nitrogen adsorption method) and a density of 0.244 g/$cm^3$. In a static batch system that contains the 1.4 grams of obtained carbon, 25 mL of the textile wastewater sample "M3" at 25° C. are added. The prepared carbon by the disclosed process, produces a 45-53% loss of blue coloring at a wavelength of 560 nm and 54% of green coloring at 400 nm after 3 days.

EXAMPLE 20

Pre-Activated Carbon (Wastewater in Batch System with Stirring)

The same material from example 19 produces a 23-26% loss of blue coloring at a wavelength of 560 nm and 31% of green coloring at 400 nm after 3 days.

It should be noted that there are alternate manners for implementing the present invention. According to this, the present embodiments and examples should only be considered as illustrative and not restrictive, and the invention should not be limited to the details contained herein, rather modified in regards to the scope and equivalents of any claim(s) issued from the present. All applications and patents cited in the present are totally incorporated in the present.

What is claimed is:

1. A metal, organic, inorganic, ionic, polymeric compound, salt and surfactant adsorption method from wastewater using a pre-activated adsorbent based on ground raw avocado seed particles or cut raw avocado seed particles obtained by the addition of NaOH solution to the seed particles to form a primary mixture and the addition of hydrogen chloride solution to form a secondary mixture, wherein the adsorption method comprises the steps of:
    packing in a column or adding to a tank in a static system or adding to a batch system, the pre-activated adsorbent; and
    passing through said column said wastewater
    agitating the wastewater with said pre-activated adsorbent in said tank or pouring said wastewater in said batch or static system.

2. The method according to claim 1, wherein the eliminated metals are nickel and zinc.

3. The method according to claim 1, wherein the mixture between the pre-activated adsorbent and the wastewater produces a yellow, red, orange, violet and/or blue de-coloration, and a COD and TOC decrease.

4. The method according to claim 3, wherein the stay time is from about 3-4 days, at least 60% of blue coloration, at least 23% of orange coloring, at least 14% of yellowish greenish coloring and at least 35% of violet coloring of said wastewater are decreased at a wavelength from 400-560 nm.

5. The method according to claim 1, wherein the ground or cut raw avocado seed particles are from a Hass variety and wherein the seed is an avocado seed embryo.

6. The method according to claim 1, wherein the particle size of the ground or cut raw avocado seed particles is less than 2 mm.

7. The method according to claim 6, wherein the particle size of the ground or cut raw avocado seed particles is between 0.3 to 1.5 mm.

8. The method according to claim 7, wherein the particle size of the ground or cut raw avocado seed particles is between 0.5 to 0.8 mm.

9. The method according to claim 1, wherein the pre-activated adsorbent is packed dry, wet or in a methanol suspension.

10. The method according to claim 1, wherein the pre-activated adsorbent is withdrawn from the column after use and carbonized at 600 to 1200° C.

* * * * *